(12) United States Patent
Heulings, IV et al.

(10) Patent No.: US 9,683,094 B2
(45) Date of Patent: Jun. 20, 2017

(54) TAPE JOINT COMPOUND

(71) Applicants: Rohm and Haas Company, Philadelphia, PA (US); Dow Global Technologies LLC, Midland, MI (US)

(72) Inventors: Harry R. Heulings, IV, Maple Shade, NJ (US); Larry N. Hyman, Midland, MI (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 652 days.

(21) Appl. No.: 13/718,085

(22) Filed: Dec. 18, 2012

(65) Prior Publication Data

US 2013/0156961 A1 Jun. 20, 2013

Related U.S. Application Data

(60) Provisional application No. 61/577,936, filed on Dec. 20, 2011.

(51) Int. Cl.
*B05D 3/02* (2006.01)
*C08L 1/28* (2006.01)
*C08L 33/02* (2006.01)
*C04B 26/06* (2006.01)
*C04B 103/00* (2006.01)
*C04B 111/00* (2006.01)
*C04B 111/10* (2006.01)

(52) U.S. Cl.
CPC ............... *C08L 1/28* (2013.01); *C04B 26/06* (2013.01); *C08L 33/02* (2013.01); *C04B 2103/0065* (2013.01); *C04B 2111/00672* (2013.01); *C04B 2111/1018* (2013.01)

(58) Field of Classification Search
CPC ............ C04B 26/06; C04B 2103/0065; C04B 2111/1018; C04B 2111/00672; C04B 14/102; C04B 14/20; C04B 14/28; C04B 24/383; C04B 2103/67; C08L 1/28; C08L 33/02

USPC .................................................... 427/385.5
See application file for complete search history.

(56) References Cited

U.S. PATENT DOCUMENTS

| | | | |
|---|---|---|---|
| 3,891,582 A | 6/1975 | Desmarais | |
| 5,102,462 A | 4/1992 | Podlas | |
| 5,334,243 A | 8/1994 | Hyman | |
| 5,336,318 A * | 8/1994 | Attard et al. | 106/780 |
| 5,574,081 A | 11/1996 | Kroon | |
| 5,653,797 A | 8/1997 | Patel | |
| 6,295,794 B1 | 10/2001 | Nordt et al. | |
| 6,476,099 B1 | 11/2002 | Cimaglio et al. | |
| 6,805,741 B1 | 10/2004 | Liu et al. | |
| 6,828,382 B1 * | 12/2004 | Loth et al. | 525/114 |
| 7,476,430 B2 | 1/2009 | Houck et al. | |
| 2004/0187741 A1 | 9/2004 | Liu et al. | |
| 2005/0056187 A1 | 3/2005 | Podlas | |
| 2008/0229981 A1 | 9/2008 | Liu et al. | |
| 2011/0214796 A1 | 9/2011 | Avramidis et al. | |
| 2013/0295277 A1 * | 11/2013 | Gozum et al. | 427/140 |

FOREIGN PATENT DOCUMENTS

| | | |
|---|---|---|
| CA | 2468638 A1 | 12/2004 |
| WO | 2009009216 A1 | 1/2009 |

* cited by examiner

*Primary Examiner* — Robert S Walters, Jr.
(74) *Attorney, Agent, or Firm* — Andrew E. C. Merriam; Ronald D. Bakule

(57) ABSTRACT

An aqueous tape joint compound including: an inorganic filler; an emulsion polymer binder; cellulose ether thickener; water; and from 0.01 to 1.3% by weight based on the weight of the aqueous joint compound, water-soluble polymer or salts thereof, the water-soluble polymer selected from the group consisting of (a) polymer consisting essentially of, as polymerized units, from 50% to 100%, by weight based on the weight of the polymer, acrylic acid, and from 0% to 50%, by weight based on the weight of the polymer, second monoethylenically unsaturated acid monomer, (b) diisobutylene-maleic anhydride polymer, and (c) mixtures thereof; the water-soluble polymer having a weight average molecular weight of from 1500 to 75,000 and a calculated Tg of from 80° C. to 250° C.; the aqueous tape joint compound being substantially free from calcium sulfate hemihydrate is provided.

8 Claims, No Drawings

TAPE JOINT COMPOUND

This invention relates to an aqueous tape joint compound. More particularly the invention relates to an aqueous tape joint compound including: an inorganic filler; an emulsion polymer binder; cellulose ether thickener; water; and from 0.01 to 1.3% by weight based on the weight of the aqueous joint compound, water-soluble polymer or salts thereof, the water-soluble polymer selected from the group consisting of (a) polymer consisting essentially of, as polymerized units, from 50% to 100%, by weight based on the weight of the polymer, acrylic acid, and from 0% to 50%, by weight based on the weight of the polymer, second monoethylenically unsaturated acid monomer, (b) diisobutylene-maleic anhydride polymer, and (c) mixtures thereof; the water-soluble polymer having a weight average molecular weight of from 1500 to 75,000 and a calculated Tg of from 80° C. to 250° C.; and wherein the aqueous tape joint compound is substantially free from calcium sulfate hemihydrate. The invention also relates to a method for forming an aqueous tape joint compound and a method for forming a monolithic surface.

Tape joint compounds are paste-like materials typically used in the construction of interior walls. In general, they are applied at the joint between two adjacent wall board panels. The purpose of the tape joint compound is then to form a monolithic surface for subsequent painting.

In general, there are two types of tape joint compound: 1) drying and 2) setting. Drying tape joint compounds are provided as ready-to-use and limestone is the predominant inorganic filler. That is, water is already well mixed with the inorganic filler, it does not react with the inorganic filler, and upon application, the water evaporates to the atmosphere. On the other hand, a setting compound is sold as a powder and water must be added at the job site. The primary inorganic filler is calcium sulfate hemihydrate and the water does react with the filler, thus, the term setting. The aqueous tape joint compound of the present invention is a drying type tape joint compound.

U.S. Pat. No. 5,102,462 discloses an aqueous joint compound composition including a water soluble polymer such as hydrophobically modified hydroxyethylcellulose and water-insoluble crosslinked polyacrylic acid polymer. Alternative aqueous tape joint compounds are still sought. The aqueous tape joint compounds of the present invention provide improved properties to the dry tape joint compound. By "improved properties" herein is meant an improvement in at least one of bond strength, crack resistance and crater resistance relative to the properties of the tape joint compound absent the water-soluble polymer.

In a first aspect of the present invention, there is provided an aqueous tape joint compound comprising: an inorganic filler; an emulsion polymer binder; cellulose ether thickener; water; and from 0.01 to 1.3% by weight based on the weight of said aqueous joint compound, water-soluble polymer or salts thereof, said water-soluble polymer selected from the group consisting of (a) polymer consisting essentially of, as polymerized units, from 50% to 100%, by weight based on the weight of said polymer, acrylic acid, and from 0% to 50%, by weight based on the weight of said polymer, second monoethylenically unsaturated acid monomer, (b) diisobutylene-maleic anhydride polymer, and (c) mixtures thereof; said water-soluble polymer having a weight average molecular weight of from 1500 to 75,000 and a calculated Tg of from 80° C. to 250° C.; and wherein said aqueous tape joint compound is substantially free from calcium sulfate hemihydrate.

In a second aspect of the present invention there is provided a method for forming an aqueous tape joint compound comprising admixing an inorganic filler; an emulsion polymer binder; cellulose ether thickener; water; and from 0.01 to 1.3% by weight based on the weight of said aqueous joint compound, water-soluble polymer or salts thereof, said water-soluble polymer selected from the group consisting of (a) polymer consisting essentially of, as polymerized units, from 50% to 100%, by weight based on the weight of said polymer, acrylic acid, and from 0% to 50%, by weight based on the weight of said polymer, second monoethylenically unsaturated acid monomer, (b) diisobutylene-maleic anhydride polymer, and (c) mixtures thereof; said polymer having a weight average molecular weight of from 1500 to 75,000 and a calculated Tg of from 80° C. to 250° C.; and wherein said tape joint compound is substantially free from calcium sulfate hemihydrate.

In a third aspect of the present invention there is provided a method for providing a monolithic surface comprising (a) providing a first planar substrate having a first edge; (b) abutting a second edge of a second planar substrate, thereby forming a joint; (c) applying the aqueous tape joint compound of any of claims 1-4 to the joint; and (d) allowing the aqueous tape joint compound to dry.

The present invention relates to an aqueous tape joint compound including: an inorganic filler; an emulsion polymer binder; cellulose ether thickener; water; and from 0.01 to 1.3% by weight based on the weight of the aqueous joint compound, water-soluble polymer. By "aqueous" herein is meant that the continuous phase is water and from 0% to 10%, by weight based on the weight of the medium, of water-miscible compound(s). Preferred is water.

The aqueous tape joint compound includes an inorganic filler. The level of inorganic filler is typically from 40% to 80% by weight, preferably from 60% to 70%, based on the weight of the aqueous tape joint compound. The predominant inorganic filler is typically calcium carbonate, usually derived from limestone. Other inorganic fillers that can be used include gypsum (predominantly calcium sulfate dihydrate), mica, clay, expanded perlite, and talc. The aqueous tape joint compound is typically substantially free from inorganic fillers that react with other components of the composition such as water; in particular the aqueous tape is substantially free from calcium sulfate hemihydrate. By "substantially free from calcium sulfate hemihydrate" herein is meant that the level of calcium sulfate hemihydrate is less than 5%, preferably less than 2%, more preferably less than 1%, and most preferably less than 0.1%, by weight based on the weight of the aqueous tape joint compound.

The aqueous tape joint compound includes an emulsion polymer binder. The emulsion polymer binder is present at a level of from 0.5% to 4%, preferably from 1% to 2%, by weight of solid polymer based on the weight of the aqueous tape joint compound. The emulsion polymer binder herein is a polymer formed by an aqueous emulsion polymerization method. Aqueous emulsion polymers and the methods of their preparation are well known in the art such as, for example, as disclosed in U.S. Pat. Nos. 4,325,856; 4,654,397; and 4,814,373. Aqueous emulsion polymer binders include single stage, multistage, polymodal size distribution, polymodal molecular weight distribution emulsion polymers, blends of such emulsion polymers, and the like. Typically, the emulsion polymer binder is a film-forming polymer under the conditions of the application of the aqueous tape joint compound, i.e., under ambient temperatures, typically at temperatures of from 10° C. to 40° C. The emulsion polymer binders may be selected from various compositional classes such as, for example, vinyl acetate polymers, vinyl acetate-acrylic copolymers, vinyl acetate-ethylene copolymers, acrylic polymers, styrene-butadiene copolymers, and blends thereof. The emulsion polymer binders typically have weight average molecular weights of from 100,000 to 10,000,000 and calculated Tgs of from −25° C. to 25° C.

The aqueous tape joint compound includes a cellulose ether thickener. The cellulose ether thickener is present at a level of from 0.2% to 0.6%, preferably from 0.3% to 0.5%, by weight of solid cellulose ether thickener based on the weight of the aqueous tape joint compound. Cellulose ether thickeners are well known in the art and in commerce and include thickeners such as, for example, hydroxyethylcellulose ("HEC"), carboxymethylcellulose ("CMC"), hydroxyethyl methylcellulose ("HEMC"), and hydroxypropyl methylcellulose ("HPMC").

The aqueous tape joint compound includes from 0.01% to 1.3%, preferably from 0.25% to 0.75%, by weight based on the weight of the aqueous joint compound, water-soluble polymer or salts thereof, the water-soluble polymer selected from the group consisting of (a) polymer consisting essentially of, as polymerized units, from 50% to 100%, preferably from 65% to 100%, by weight based on the weight of the polymer, acrylic acid, and from 0% to 50%, preferably from 0% to 35%, by weight based on the weight of the polymer, second monoethylenically unsaturated acid monomer, (b) diisobutylene-maleic anhydride polymer, and (c) mixtures thereof. By "water-soluble polymer" herein is meant that the polymer is completely soluble at a level of 10% by weight in water at a final pH (i.e., pH of the resultant solution) of 7.5 at 21° C.

The water-soluble polymer of group (a) may be a water-soluble polymer consisting essentially of, as polymerized units, from 50% to 100%, preferably from 65% to 100%, by weight based on the weight of the polymer, acrylic acid, and from 0% to 50%, preferably from 0% to 35%, by weight based on the weight of the polymer, second monoethylenically unsaturated acid monomer. By "second monoethylenically unsaturated acid monomer" herein is meant any monoethylenically unsaturated acid monomer other than acrylic acid that is capable of copolymerization with acrylic acid. That is, the composition of the water-soluble polymer of group (a) may be poly(acrylic acid) or a copolymer of acrylic acid with from 0% to 50%, preferably from 0% to 35%, by weight based on the weight of the polymer, second monoethylenically unsaturated acid monomer. The second monoethylenically unsaturated acid monomer includes, for example, methacrylic acid, crotonic acid, itaconic acid, fumaric acid, maleic acid, monomethyl itaconate, monomethyl fumarate, monobutyl fumarate, maleic anhydride, S-acid monomers such as sulfoethyl methacrylate, acrylamido-2-methyl propane sulfonic acid, and sodium styrene sulfonate, and P-acid monomers such as phosphoethyl methacrylate. In the polymer composition herein end groups are not included in the description of the water-soluble polymer or in the calculation of the weight contribution of individual polymerized comonomer of any copolymer. By "water-soluble polymer consisting essentially of . . . " is meant herein that low levels of third monomers other than acrylic acid and second monoethylenically unsaturated acid monomers that do not materially affect the performance of the tape joint compound may be included, as copolymerized units, in the water-soluble polymer of group (a). In any event less than 5% by weight, preferably less than 1%, more preferably less than 0.1%, and most preferably 0%, based on the weight of the polymer of such third monomers are included. Independently, the water-soluble polymer of group (a) includes, as copolymerized units, substantially no multiethylenically unsaturated monomers, to the extent that is required to preserve the water solubility of the water-soluble polymer of group (a). The water-soluble polymers of group (a) are typically formed by free radical addition polymerization in the presence or absence of chain transfer agent including, for example, bisulfite and its salts, hypophosphite and its salts, mercaptans, and chain transfer solvents such as xylene, toluene, and isopropanol. Such reactions are disclosed, for example, in U.S. Pat. Nos. 4,530,766A and 4,711,725A.

The water-soluble polymer of group (b) is a diisobutylene-maleic anhydride polymer. In the art and herein the "diisobutylene-maleic anhydride polymer" is actually the copolymer of the terminally unsaturated diisobutylene isomer 2,4,4-trimethylpentene-1 with maleic anhydride. The diisobutylene-maleic anhydride polymer herein includes partially or wholly hydrolyzed analogues and salts thereof. The ratio of diisobutylene/maleic anhydride is from 5/1 to 1/5, preferably from 2/1 to 1/2, on a weight basis. An additional ethylenically unsaturated monomer, such as, for example, styrene may be incorporated into the diisobutylene-maleic anhydride polymer to an extent that water solubility is not compromised. Typically the diisobutylene-maleic anhydride polymer is formed by isomerization of diisobutylene with subsequent copolymerization as is disclosed, for example, in U.S. Pat. No. 5,453,476.

The water-soluble polymer has a weight average molecular weight of from 1500 to 75,000, preferably of from 1700 to 50,000. The weight average molecular weight herein is that determined by gel permeation chromatography using the method in the Test Methods section.

The water-soluble polymer has a calculated glass transition temperature ("Tg") of from 80° C. to 250° C. Tgs of all polymers herein are those calculated by using the Fox equation (T. G. Fox, Bull. Am. Physics Soc., Volume 1, Issue No. 3, page 123 (1956)), that is, for calculating the Tg of a copolymer of monomers M1 and M2, $$1/Tg(\text{calc.}) = w(M1)/Tg(M1) + w(M2)/Tg(M2),$$

wherein
Tg(calc.) is the glass transition temperature calculated for the copolymer
w(M1) is the weight fraction of monomer M1 in the copolymer
w(M2) is the weight fraction of monomer M2 in the copolymer
Tg(M1) is the glass transition temperature of the homopolymer of M1
Tg(M2) is the glass transition temperature of the homopolymer of M2,
all temperatures being in ° K.

End groups of the polymer are not included in the calculation. The glass transition temperature of homopolymers may be found, for example, in "Polymer Handbook", edited by J. Brandrup and E. H. Immergut, Interscience Publishers.

The method of the present invention for forming an aqueous tape joint compound includes admixing an inorganic filler; an emulsion polymer binder; cellulose ether thickener; water; and from 0.01% to 1.3% by weight based on the weight of the aqueous joint compound, water-soluble polymer or salts thereof, the water-soluble polymer selected from the group consisting of (a) polymer consisting essentially of, as polymerized units, from 50% to 100%, by weight based on the weight of the polymer, acrylic acid, and from 0% to 50%, by weight based on the weight of the polymer, second monoethylenically unsaturated acid monomer, (b) diisobutylene-maleic anhydride polymer, and (c) mixtures thereof; the polymer having a weight average molecular weight of from 1500 to 75,000 and a calculated Tg of from 80° C. to 250° C.; and wherein the aqueous tape joint compound is substantially free from calcium sulfate hemihydrate. Other ingredients such as biocides, defoamers, and surfactants may be included in the aqueous tape joint compounds. Variations in the physical form of the components and in the order of mixing are contemplated. For example, the emulsion polymer binder may be supplied as an aqueous dispersion of polymer or in a solid form as resulting, for example, from the spray-drying of the aqueous emulsion polymer. The cellulose ether thickener may be supplied in aqueous solution or, more typically, in solid powder form. Further, the water-soluble polymer may be provided in a solid powder form or in a fluid solution form. Preferably, the aqueous tape joint compound has a solids level of from 50% to 95%, or from 60% to 90%, or, preferably from 65% to 90%, by weight based on the weight of the aqueous tape joint compound. The pH of the aqueous tape joint compound is typically in the range of from 3 to 11, preferably, in the range of from 6 to 8. The viscosity of the aqueous tape joint compound is typically in the range of 400 to 800 Braebender units ("BU") at 25° C.

The method of the present invention for providing a monolithic surface includes (a) providing a first planar substrate having a first edge; (b) abutting a second edge of a second planar substrate, thereby forming a joint; (c) applying the aqueous tape joint compound of the present invention to the joint; and (d) allowing the aqueous tape joint compound to dry. The first planar substrate is typically wallboard, gypsum board, drywall, or the like. The abutting edge, typically of the same material, when installed usually leaves a small gap, possibly irregular in width, or joint. The tape joint compound fills the joint and provides a smooth surface eliminating or minimizing the joint. Typically, a joint tape, usually a paper-based tape, is applied to the wet joint compound bridging the area of the joint and a further application of aqueous tape joint compound is applied to the area so as to embed the tape within the tape joint compound. Multiple applications of aqueous tape joint compound may be required to provide a substantially smooth surface. Further, smoothing operations such as sanding may be effected after the tape joint compound surface is sufficiently dry.

Aqueous tape joint compounds are generally applied, for example, to a wall board panel with a broad knife or with a mechanical tool which simulates the action of a broad knife trowelling the tape joint compound. Drying is typically allowed to proceed under ambient conditions such as, for example, at from 10° C. to 40° C.

EXPERIMENTAL TEST METHODS

Unless otherwise indicated, all samples were tested as made, and not diluted.

Viscosity—

Measured in Brabender units (BU) using ASTM Standard C474, 2011, "Standard Test Methods for Joint Treatment Materials for Gypsum Board Construction", ASTM International, West Conshohocken, Pa., 2003, DOI: 10,1520/C0033-03, at the website www.astm.org. All samples were equilibrated and measured at 25° C.

Weight Average Molecular Weight—

Weight average molecular weight herein is that determined by aqueous gel permeation chromatography (GPC) using an Agilent 1100 HPLC system (Agilent Technologies Santa Clara, Calif.) equipped with an isocratic pump, vacuum degasser, variable injection size auto-sampler, and column heater. The detector was a Refractive Index Agilent 1100 HPLC G1362A. The software used to chart weight average molecular weight was an Agilent ChemStation, version B.04.02 with Agilent GPC-add on version B.01.01. The column set was TOSOH Bioscience TSKgel G2500PWxl 7.8 mm ID×30 cm, 7 μm column (P/N 08020) (TOSOH Bioscience USA South San Francisco, Calif.) and a TOSOH Bioscience TSKgel GMPWxl 7.8 mm ID×30 cm, 13 μm (P/N 08025) column. A 20 mM Phosphate buffer in MilliQ HPLC Water, pH~7.0 was used as the mobile phase. The flow rate was 1.0 ml/minute. A typical injection volume was 20 μL. The system was calibrated using poly(acrylic acid), Na salts Mp 216 to Mp 1,100,000, with Mp 900 to Mp 1,100,000 standards from American Polymer Standards (Mentor, Ohio).

Tape Bond Adhesion—

Using 0.635 mm (25/1000 inch) feeler gauges, the formulation was applied to a piece of wall board. A template was used to reproduce the exact same geometry. A piece of joint tape paper, making three replicates using the outer tape side (manufacturer recommended side) and three replicates using the inner tape side, was embedded in the formulation. The tape paper was 152.4 mm (6 inch) long, with 101.6 mm (4 inch) being embedded and 50.8 mm (2 inch) not embedded. The formulation was allowed to dry in a controlled environment at 21° C. (70° F.) and 50% relative humidity. Using the 50.8 mm (2 inch), non-embedded tail to hold on to, a tensile tester pulled apart the tape paper from the formulation in a 90 degree t-peel test and quantified the amount of force required to break the adhesion between the tape and the compound.

Cracking—

Cracking was rated by drying the tape joint compound in a standard crack ring. Templates were fabricated from 6.35 mm Plexiglas™. A 69.85 mm diameter circle was cut away from the Plexiglas™. The template was placed on a piece of wall board. The formulation was spread into the 69.85 mm diameter, 6.35 mm deep cylinder and set-up in duplicate. The formulation was allowed to dry over night in a controlled environment at 21° C. (70° F.) and 50% relative humidity. After drying, the samples were rated for the visual degree of cracking observed and a numerical rating was generated according to the chart:

| Visual Degree of Cracking | Numerical rating |
|---|---|
| None | 10 |
| Trace | 8 |
| Slight | 6 |
| Moderate | 4 |
| Heavy | 2 |

Performed in duplicate, average reported

Cratering—

Cratering was rated by using an automatic apparatus to drawdown the tape joint compound diluted with water to a 500 BU and 400 BU viscosity, respectively, over wallboard at a fixed thickness and time. This test was performed in duplicate and the test boards were dried overnight in a controlled environment at 21° C. (70° F.) and 50% relative humidity. The resultant dry joint compound drawdowns were rated for the visual degree of cratering observed and a numerical rating was generated according to the chart:

| Visual Degree of Cratering | Numerical rating |
|---|---|
| None | 10 |
| Trace | 8 |
| Slight | 6 |
| Moderate | 4 |
| Heavy | 2 |

Performed in duplicate, average reported

The following examples serve to illustrate the invention.

Water-Soluble Polymers

Water-soluble polymer A=Acrylic acid/maleic acid copolymer, neutralized form, sodium salt, Mw=1900.
Water-soluble polymer B=poly(acrylic acid); Mw=4,500.
Water-soluble polymer C is a diisobutylene-maleic anhydride copolymer (50/50, wt/wt), hydrolyzed, sodium salt, Mw=10,000.
Water-soluble polymer D=poly(acrylic acid), neutralized form, sodium salt, Mw=3,700.
Water-soluble polymer E=Acrylic acid/maleic acid copolymer (80/20, wt/wt); Mw=40,000.
Water-soluble polymer F=Acrylic acid/maleic acid copolymer (70/30, wt/wt); Mw=70,000.
Water-soluble polymer G=Acrylic acid/2-acrylamido-2-methyl propane sulfonic acid (70/30, wt/wt) copolymer, sodium salt, Mw=12,000

Examples 1-42 and Comparative Examples A-B

Regular weight aqueous tape joint compound formulation for Examples 1-42 and Comparative Examples A-B.

| Ingredient | Parts by weight |
|---|---|
| Water | 29.8% |
| Calcium carbonate | 61.9% |
| Mica 4K | 3.6% |
| ATTAGEL™ 25 Clay | 2.0% |
| Biocide | 0.1% |
| Emulsion polymer, PVA (60% solids) | 2.2% |
| Cellulose ether thickener | 0.4% |
| Water-soluble polymer | 0-1.3% |

Notes:
Mica 4K, dry ground muscovite mica with 47 micron average particle size, product of Imerys Minerals, Ltd.;
ATTAGEL™ 25 Clay, attapulgite clay with 15 micron average particle size, product of BASF GmbH.

EXAMPLES 1-20 and COMPARATIVE EXAMPLE A. The aqueous tape joint compounds of Examples 1-20 and Comparative Example A contain WALOCEL™ MK25000 PFV (HPMC) (WALOCEL™ is a trademark of The Dow Chemical Co.) as the cellulose ether thickener. Table 1.1 provides the identification and level of water-soluble polymer of the Examples and results of the testing of viscosity (BU), adhesion, cracking and cratering.

TABLE 1.1

Performance of tape joint compounds.

| Ex # | % Solids | % Water-soluble polymer | Water-soluble polymer | Viscosity (BU) | Peel Adhesion (lbs/in) Bond in | Bond out | Total | Crack | Crater 500 BU | 400 BU |
|---|---|---|---|---|---|---|---|---|---|---|
| Comp. A | 69.4 | 0% | | 660 | 0.61 | 1.04 | 1.65 | 9 | 6.5 | 6 |
| 1 | 69.4 | 0.07% | A | 690 | 0.71 | 1.15 | 1.85 | 9.5 | 7 | 7.5 |
| 2 | 69.4 | 0.14% | A | 680 | 0.87 | 1.19 | 2.06 | 8 | 7.5 | 8 |
| 3 | 69.3 | 0.27% | A | 640 | 1.04 | 1.15 | 2.19 | 8.5 | 6.5 | 7 |
| 4 | 69.4 | 0.07% | B | 650 | 0.74 | 1.14 | 1.88 | 9 | 6.5 | 7.5 |
| 5 | 69.4 | 0.14% | B | 630 | 0.93 | 1.12 | 2.05 | 7 | 7.5 | 8 |
| 6 | 69.3 | 0.27% | B | 610 | 0.97 | 1.13 | 2.10 | 10 | 8 | 8.5 |
| 7 | 69.4 | 0.07% | B powder | 650 | 0.82 | 1.13 | 1.95 | 7.5 | 8.5 | 8 |
| 8 | 69.4 | 0.14% | B powder | 615 | 0.83 | 1.15 | 1.97 | 7.5 | 8.5 | 8.5 |
| 9 | 69.4 | 0.27% | B powder | 640 | 0.62 | 1.12 | 1.74 | 7 | 8 | 7.5 |
| 10 | 69.4 | 0.07% | C | 600 | 0.87 | 0.83 | 1.70 | 7 | 7.5 | 8.5 |
| 11 | 69.3 | 0.14% | C | 570 | 1.15 | 0.99 | 2.14 | 9 | 7.5 | 8.5 |
| 12 | 69.8 | 1.3% | C | 490 | 1.50 | 1.15 | 2.65 | 8 | 6 | 9 |
| 13 | 69.4 | 0.07% | C powder | 540 | 0.88 | 1.02 | 1.90 | 9.5 | 8 | 8 |
| 14 | 69.4 | 0.14% | C powder | 540 | 0.95 | 0.96 | 1.92 | 8 | 8 | 8.5 |
| 15 | 69.4 | 0.27% | C powder | 560 | 0.91 | 1.32 | 2.23 | 7 | 8.5 | 8 |
| 16 | 69.5 | 0.67% | C powder | 580 | 0.99 | 1.35 | 2.34 | 7 | 6.5 | 7 |
| 17 | 69.4 | 0.07% | D | 680 | 0.88 | 0.90 | 1.77 | 9 | 7 | 8.5 |
| 18 | 69.3 | 0.14% | D | 660 | 1.03 | 0.90 | 1.93 | 10 | 7 | 8 |
| 19 | 69.3 | 0.27% | D | 640 | 1.22 | 0.98 | 2.19 | 9 | 8.5 | 8.5 |
| 20 | 69.0 | 1.3% | D | 520 | 0.53 | 1.01 | 1.54 | 9 | 8 | 8.5 |

EXAMPLES 21-42 and COMPARATIVE EXAMPLE B. The aqueous tape joint compounds of Examples 21-42 and Comparative Example B contain METHOCEL™ J75 MS-N (HPMC) (METHOCEL™ is a trademark of The Dow Chemical Co.) as the cellulose ether thickener. Table 21.1 provides the identification and level of water-soluble polymer of the Examples and results of the testing of viscosity (BU), adhesion, cracking and cratering.

TABLE 21.1

Performance of tape joint compounds.

| Ex # | % Solids | % Water-soluble polymer | Water-soluble polymer | Viscosity (BU) | Peel Adhesion (lbs/in) Bond in | Bond out | Total | Crack | Crater 500 BU | 400 BU |
|---|---|---|---|---|---|---|---|---|---|---|
| Comp. B | 69.4 | 0% | | 660 | 0.45 | 1.07 | 1.52 | 3 | 4.5 | 4.5 |
| 21 | 69.4 | 0.07% | A | 610 | 0.60 | 1.13 | 1.73 | 4 | 5 | 5 |
| 22 | 69.4 | 0.14% | A | 650 | 0.87 | 1.10 | 1.97 | 5 | 6 | 7 |
| 23 | 69.3 | 0.27% | A | 620 | 1.06 | 1.05 | 2.11 | 5 | 5.5 | 8 |
| 24 | 69.2 | 0.67% | A | 590 | 0.79 | 0.89 | 1.68 | 8 | 6 | 6 |
| 25 | 69.1 | 1.3% | A | 540 | 0.45 | 0.58 | 1.04 | 6 | 5.5 | 6.5 |

TABLE 21.1-continued

Performance of tape joint compounds.

| Ex # | % Solids | % Water-soluble polymer | Water-soluble polymer | Viscosity (BU) | Peel Adhesion (lbs/in) Bond in | Bond out | Total | Crack | Crater 500 BU | 400 BU |
|---|---|---|---|---|---|---|---|---|---|---|
| 26 | 69.4 | 0.07% | B | 645 | 0.82 | 0.95 | 1.76 | 4 | 5 | 5 |
| 27 | 69.4 | 0.14% | B | 630 | 0.92 | 1.03 | 1.95 | 3 | 5 | 6 |
| 28 | 69.3 | 0.27% | B | 585 | 0.93 | 0.99 | 1.93 | 6 | 5.5 | 6 |
| 29 | 69.2 | 0.67% | B | 570 | 0.58 | 0.92 | 1.50 | 5.5 | 6 | 5 |
| 30 | 69.1 | 1.3% | B | 510 | 0.38 | 0.76 | 1.13 | 5.5 | 5 | 5.5 |
| 31 | 69.4 | 0.07% | B powder | 620 | 0.94 | 1.02 | 1.97 | 6.5 | 5 | 5 |
| 32 | 69.4 | 0.14% | B powder | 640 | 1.04 | 1.06 | 2.09 | 2 | 5.5 | 6 |
| 33 | 69.4 | 0.27% | B powder | 630 | 1.09 | 1.08 | 2.17 | 4 | 5 | 7 |
| 34 | 69.4 | 0.07% | C | 660 | 0.56 | 1.05 | 1.61 | 9.5 | 5 | 5 |
| 35 | 69.3 | 0.14% | C | 590 | 0.62 | 0.97 | 1.59 | 6 | 7 | 6.5 |
| 36 | 69.3 | 0.27% | C | 540 | 0.61 | 0.99 | 1.60 | 9.5 | 7 | 6 |
| 37 | 69.3 | 0.27% | E | 640 | 0.95 | 1.07 | 2.02 | 6 | 6 | 7 |
| 38 | 69.3 | 0.27% | G | 850 | 0.74 | 0.99 | 1.73 | 8 | 6.5 | 6.5 |
| 39 | 69.4 | 0.14% | F | 680 | 0.50 | 0.83 | 1.33 | 4.5 | 3 | 3 |
| 40 | 69.3 | 0.27% | F | 630 | 0.58 | 0.97 | 1.56 | 4.5 | 5 | 5 |
| 41 | 69.2 | 0.67% | F | 580 | 0.76 | 0.96 | 1.72 | 8 | 5 | 5 |
| 42 | 69.1 | 1.3% | F | 560 | 0.77 | 0.97 | 1.75 | 5 | 5.5 | 6.5 |

Examples 43-48 and Comparative Examples C-D

Regular weight aqueous tape joint compound formulation for Examples 43-48 and Comparative Examples C-D.

| Ingredient | Use levels for examples |
|---|---|
| Water | 29.1% |
| Calcium carbonate | 62.0% |
| Mica 4K | 3.6% |
| ATTAGEL ™ 25 Clay | 2.0% |
| Biocide | 0.1% |
| Latex, PVA (60% solids) | 2.7% |
| Thickener | 0.4% |
| Water-soluble polymer | 0-0.27% |

EXAMPLES 43-45 and COMPARATIVE EXAMPLE C. The aqueous tape joint compounds of Examples 43-45 and Comparative Example C contain METHOCEL™ 240S (HPMC) as the cellulose ether thickener. Table 43.1 provides the identification and level of water-soluble polymer of the Examples and results of the testing of viscosity (BU), adhesion, cracking and cratering.

TABLE 43.1

Performance of tape joint compounds

| Ex # | % Solids | % Water-soluble polymer | Water-soluble polymer | Viscosity BU | Peel Adhesion (lbs/in) Bond in | Bond out | Total | Crack | Crater 500 BU | 400 BU |
|---|---|---|---|---|---|---|---|---|---|---|
| Comp. C | 69.8 | 0% | | 690 | 0.93 | 1.10 | 2.03 | 6 | 7 | 7.5 |
| 43 | 69.8 | 0.07% | B | 700 | 0.87 | 1.18 | 2.05 | 7 | 8.5 | 8 |
| 44 | 69.8 | 0.14% | B | 680 | 1.12 | 1.13 | 2.25 | 9 | 8.5 | 9 |
| 45 | 69.7 | 0.27% | B | 660 | 1.25 | 1.17 | 2.42 | 8 | 9 | 9 |

EXAMPLES 46-48 and COMPARATIVE EXAMPLE D. The aqueous tape joint compounds of Examples 46-48 and Comparative Example D contain CELLOSIZE™ QP 52000 (HEC) (CELLOSIZE™ is a trademark of The Dow Chemical Co.) as the cellulose ether thickener. Table 46.1, below, provides the identification and level of water-soluble polymer of the Examples and results of the testing of viscosity (BU), adhesion, cracking and cratering.

TABLE 46.1

Performance of tape joint compounds

| Ex # | % Solids | % Water-soluble polymer | Water-soluble polymer | Viscosity BU | Peel Adhesion (lbs/in) | | | Crack | Crater | |
| | | | | | Bond in | Bond out | Total | | 500 BU | 400 BU |
| --- | --- | --- | --- | --- | --- | --- | --- | --- | --- | --- |
| Comp. D | 69.8 | 0% | | 660 | 0.37 | 0.37 | 0.74 | 10 | 3 | 4 |
| 46 | 69.8 | 0.07% | B | 680 | 0.40 | 0.49 | 0.89 | 7.5 | 4 | 6.5 |
| 47 | 69.8 | 0.14% | B | 670 | 0.42 | 0.52 | 0.94 | 7 | 4 | 6.5 |
| 48 | 69.7 | 0.27% | B | 640 | 0.51 | 0.68 | 1.19 | 9.5 | 3.5 | 5.5 |

Examples 49-56 and Comparative Example E

Light weight aqueous tape joint compound formulation for Examples 49-56 and Comparative Example E.

| Ingredient | Use levels for examples |
| --- | --- |
| Water | 40.0% |
| Calcium carbonate | 46.8% |
| SIL-CEL ™ 35/34 | 7.9% |
| ATTAGEL ™ 25 Clay | 2.6% |
| Biocide | 0.1% |
| Latex, PVA (60% solids) | 2.2% |
| Thickener | 0.5% |
| Water-soluble polymer | 0-0.7% |

Note:
SIL-CEL ™ 35/34, expanded perlite with 40 micron particle size, product of Silibrico Corp.

EXAMPLES 49-56 and COMPARATIVE EXAMPLE E. The aqueous tape joint compounds of Examples 49-56 and Comparative Example E contain METHOCEL™ J75MSN (HPMC) as the cellulose ether thickener. Table 49.1, below provides the identification and level of water-soluble polymer of the Examples and results of the testing of viscosity (BU), adhesion, cracking and cratering.

TABLE 49.1

| Ex # | Solids Wt % | % Water-soluble polymer | Water-soluble polymer | Viscosity BU | Peel Adhesion (lbs/in) | | | Crack | Crater | |
| | | | | | Bond in | Bond out | Total | | 500 BU | 400 BU |
| --- | --- | --- | --- | --- | --- | --- | --- | --- | --- | --- |
| Comp. E | 59.1 | 0% | | 620 | 0.24 | 0.42 | 0.66 | 9.5 | 5 | 6 |
| 49 | 59.1 | 0.3 | A | 585 | 0.29 | 0.48 | 0.77 | 10 | 5 | 6.5 |
| 50 | 59.1 | 0.7 | A | 550 | 0.33 | 0.54 | 0.87 | 9.5 | 6.5 | 7.5 |
| 51 | 59.1 | 0.3 | B | 580 | 0.7 | 0.97 | 1.68 | 9.5 | 5 | 7 |
| 52 | 59.0 | 0.7 | B | 570 | 0.42 | 0.82 | 1.24 | 9 | 5.5 | 8 |
| 53 | 59.2 | 0.3 | B powder | 580 | 0.35 | 0.99 | 1.34 | 9.5 | 5.5 | 8 |
| 54 | 59.0 | 0.3 | C | 500 | 0.25 | 0.56 | 0.81 | 9.5 | 7 | 7 |
| 55 | 59.1 | 0.1 | D | 560 | 0.24 | 0.51 | 0.75 | 9.5 | 6 | 7.5 |
| 56 | 59.1 | 0.3 | D | 550 | 0.70 | 1.07 | 1.77 | 9 | 6 | 8 |

What is claimed is:

1. An aqueous tape joint compound comprising: an inorganic filler; from 0.5 to 4% by weight as solid polymer based on the weight of said aqueous joint compound of an emulsion polymer binder; cellulose ether thickener; water; and from 0.01 to 1.3% by weight based on the weight of said aqueous joint compound, water-soluble polymer or salts thereof, said water-soluble polymer selected from the group consisting of (a) polymer consisting essentially of, as polymerized units, from 50% to 100%, by weight based on the weight of said polymer, acrylic acid, and from 0% to 50%, by weight based on the weight of said polymer, second monoethylenically unsaturated acid monomer, (b) diisobutylene-maleic anhydride polymer, and (c) mixtures thereof;
said water-soluble polymer having a weight average molecular weight of from 1500 to 75,000 and a calculated Tg of from 80° C. to 250° C.; and
wherein said aqueous tape joint compound is substantially free from calcium sulfate hemihydrate.

2. The aqueous tape joint compound of claim 1 wherein said water-soluble polymer has a weight average molecular weight of from 1700 to 50,000.

3. The aqueous tape joint compound of claim 1 wherein said water-soluble polymer consists essentially of polyacrylic acid.

4. The aqueous tape joint compound of claim 1 having a Braebender viscosity of from 400 to 800 BU.

5. A method for forming an aqueous tape joint compound comprising admixing an inorganic filler; from 0.5 to 4% by weight as solid polymer based on the weight of said aqueous joint compound of an emulsion polymer binder; cellulose ether thickener; water; and from 0.01 to 1.3% by weight based on the weight of said aqueous joint compound, water-soluble polymer or salts thereof, said water-soluble polymer selected from the group consisting of (a) polymer consisting essentially of, as polymerized units, from 50% to 100%, by weight based on the weight of said polymer, acrylic acid, and from 0% to 50%, by weight based on the weight of said polymer, second monoethylenically unsaturated acid monomer, (b) diisobutylene-maleic anhydride polymer, and (c) mixtures thereof;
said water-soluble polymer having a weight average molecular weight of from 1500 to 75,000 and a calculated Tg of from 80° C. to 250° C.; and
wherein said tape joint compound is substantially free from calcium sulfate hemihydrate.

6. The method of claim 5 wherein said water-soluble polymer is provided in solid powder form.

7. A method for providing a monolithic surface comprising (a) providing a first planar substrate having a first edge;
(b) abutting a second edge of a second planar substrate, thereby forming a joint;
(c) applying the aqueous tape joint compound of any of claims 1-4 to the joint; and
(d) allowing the aqueous tape joint compound to dry.

8. The method according to claim 7 further comprising applying a joint tape to said joint prior to step (c) or embedded into the aqueous tape joint compound prior to step (d).

* * * * *